US011129106B2

(12) United States Patent
Jiang

(10) Patent No.: US 11,129,106 B2
(45) Date of Patent: Sep. 21, 2021

(54) SYSTEMS AND METHODS FOR A TRANSCEIVER THAT PERFORMS NETWORK FUNCTIONS ON BEHALF OF A DEVICE IN A LOW-POWER MODE

(71) Applicant: Denso International America, Inc., Southfield, MI (US)

(72) Inventor: Wei Jiang, Northville, MI (US)

(73) Assignee: DENSO International America, Inc., Southfield, MI (US)

( * ) Notice: Subject to any disclaimer, the term of this patent is extended or adjusted under 35 U.S.C. 154(b) by 190 days.

(21) Appl. No.: 16/263,259

(22) Filed: Jan. 31, 2019

(65) Prior Publication Data

US 2020/0252868 A1 Aug. 6, 2020

(51) Int. Cl.
H04W 52/02 (2009.01)
G06F 1/329 (2019.01)
G06F 1/3293 (2019.01)

(52) U.S. Cl.
CPC .......... H04W 52/028 (2013.01); G06F 1/329 (2013.01); G06F 1/3293 (2013.01); H04W 52/0277 (2013.01)

(58) Field of Classification Search
None
See application file for complete search history.

(56) References Cited

U.S. PATENT DOCUMENTS

| | | | |
|---|---|---|---|
| 6,484,082 B1 | 11/2002 | Millsap et al. | |
| 9,874,923 B1 * | 1/2018 | Brown | G06F 1/26 |
| 2005/0283304 A1 * | 12/2005 | Endo | F02D 41/26 701/114 |
| 2007/0208470 A1 * | 9/2007 | Itabashi | H04L 12/4135 701/36 |
| 2009/0037044 A1 * | 2/2009 | Enomoto | G07C 5/008 701/29.6 |
| 2010/0070642 A1 * | 3/2010 | Bansal | H04L 67/2861 709/230 |
| 2010/0070665 A1 * | 3/2010 | Swaminathan | G06F 1/3209 710/106 |
| 2010/0149968 A1 | 6/2010 | Reinold et al. | |
| 2012/0109407 A1 * | 5/2012 | Yousefi | G06F 1/266 701/1 |
| 2012/0320793 A1 | 12/2012 | Balbierer et al. | |
| 2014/0047255 A1 * | 2/2014 | Sasaki | H04L 41/06 713/323 |
| 2014/0071866 A1 * | 3/2014 | Maciocco | H04W 52/0229 370/311 |
| 2015/0298626 A1 * | 10/2015 | Okuyama | B60W 50/045 701/1 |
| 2017/0353838 A1 * | 12/2017 | Siswick | H04W 52/0235 |
| 2018/0039316 A1 * | 2/2018 | Brown | H04L 12/40039 |

* cited by examiner

Primary Examiner — Hassan A Phillips
Assistant Examiner — Gautam Sharma
(74) Attorney, Agent, or Firm — Christopher G. Darrow; Darrow Mustafa PC

(57) ABSTRACT

System, methods, and other embodiments described herein relate to conserving energy in a device attached to a transceiver. In one embodiment, a method includes, in response to the device entering a low power mode, monitoring communications received in the transceiver on behalf of the device to determine when to wake the device out of the low-power mode according to at least a wake condition. The method includes performing, by the transceiver, at least one network function on behalf of the device when the device is in the low-power mode.

19 Claims, 4 Drawing Sheets

SYSTEMS AND METHODS FOR A TRANSCEIVER THAT PERFORMS NETWORK FUNCTIONS ON BEHALF OF A DEVICE IN A LOW-POWER MODE

TECHNICAL FIELD

The subject matter described herein relates in general to systems and methods for conserving energy in a device such as a microcontroller and, more particularly, to a smart transceiver that performs network functions on behalf of the device when the device is in a low-power mode.

BACKGROUND

Conserving energy can be a primary concern for electronic systems that function without a continuous wireline connection such as electric vehicles, mobile phones, and similar devices. In the context of a vehicle, some vehicles (e.g., hybrids) may have multiple sources of power such as an engine/generator, regenerative brakes, battery bank, and so on. However, other vehicles such as pure electric vehicles may not have more robust options to generate power such as a generator. In either case, the efficient use of energy by separate components within the vehicle is generally desirable in order to improve energy consumption and extend operation (e.g., range) of the vehicle.

The efficient use of power within the context of vehicle subsystems is a complex difficulty. For example, a vehicle may include many different devices (e.g., microcontrollers such as ECUs) that communicate over a network to provide information about current states of the controllers, receive information about current states of the vehicle, and so on. However, the vehicle generally maintains all of the connected devices in a powered-on state while operating. That is, even though a particular device (e.g., a microcontroller for a power seat with memory options) may not be used during a majority of a time while the vehicle is operating, the device remains in a powered-on state and thus draws power from the vehicle thereby reducing an overall efficiency. Such an approach to powering such devices while operating the vehicle can reduce overall range in an electric vehicle or reduce fuel efficiency in a hybrid or gas vehicle.

SUMMARY

In one embodiment, example systems and methods are disclosed that are associated with a smart transceiver that facilitates conserving power in an associated device. As previously noted, various configurations of vehicle networks generally involve maintaining all devices in a powered-on state in order for the devices to monitor communications and provide various network communications in response while waiting for commands to perform different actions. As may be expected, such an approach is generally inefficient and may result in excess consumption of electric energy thereby effecting overall operating efficiency of a vehicle (e.g., electric vehicle).

Therefore, in one embodiment, a smart transceiver is disclosed that performs various network functions on behalf of the device so that the device can remain in a low-power mode (e.g., electrically powered off or substantially off). For example, in one approach, the disclosed smart transceiver is powered separately from an associated device such as a microcontroller, electronic control unit (ECU), or another similar device. Thus, when the microcontroller enters a low-power mode, the smart transceiver performs network functions on behalf of the microcontroller.

In one aspect, the smart transceiver periodically transmits node alive messages on behalf of the microcontroller in order to maintain a presence of the microcontroller on the network and ensure that the microcontroller continues to meet protocols of the network even though operating in the low-power mode. In further aspects, the smart transceiver actively monitors communications on the network on behalf of the microcontroller. For example, the smart transceiver, in one approach, buffers communications from the network while the microcontroller is in the low-power mode. The smart transceiver, in one embodiment, analyzes the communications to determine, for example, whether the microcontroller should be activated into a powered-on state from the low-power mode. In various approaches, the smart transceiver may be configured to wake the microcontroller according to different wake conditions that can include identifying that a communication is directed to the microcontroller, a change in state of the network, and so on. Thus, the smart transceiver can provide the buffered communications to the microcontroller upon the microcontroller exiting the low-power mode. In this way, the smart transceiver provides for maintaining the microcontroller in the low-power mode in order to improve efficient operation while continuing to perform network functions as needed.

In one embodiment, a transceiver for providing communications between a network and a device is disclosed. The transceiver includes a buffer for storing the communications, one or more processors, and a memory that is communicably coupled to the one or more processors. The memory stores a power module including instructions that when executed by the one or more processors cause the one or more processors, in response to the device associated with the transceiver entering a low power mode, analyze communications received in the transceiver to determine whether at least one of the communications satisfies a wake condition for waking the device out of the low-power mode. The memory stores a communication module including instructions that when executed by the one or more processors cause the one or more processors to perform a network function on behalf of the device when the device is in the lower power mode.

In one embodiment, a non-transitory computer-readable medium is disclosed. The computer-readable medium stores instructions for conserving energy in a device attached to a transceiver and that when executed by one or more processors cause the one or more processors to perform the disclosed functions. The instructions include instructions to, in response to the device associated with the transceiver entering a low power mode, analyze communications received in the transceiver to determine whether at least one of the communications satisfies a wake condition for waking the device out of the low-power mode. The instructions further include instructions to perform a network function on behalf of the device when the device is in the lower power mode.

In one embodiment, a method of conserving energy in a device attached to a transceiver is disclosed. The method includes, in response to the device entering a low power mode, monitoring communications received in the transceiver on behalf of the device to determine when to wake the device out of the low-power mode. The method includes performing, by the transceiver, at least one network function on behalf of the device when the device is in the lower power mode.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
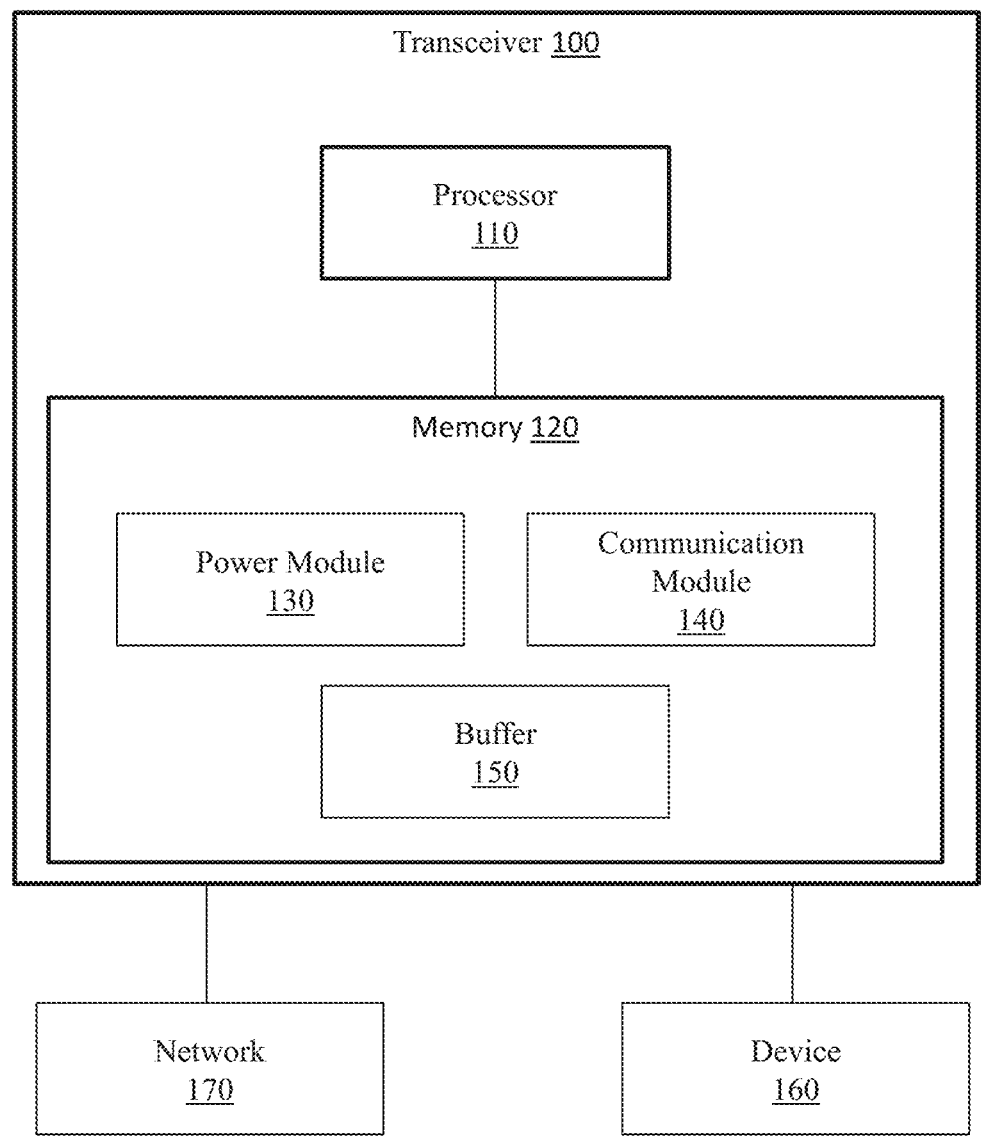
FIG. 1 illustrates one embodiment of a transceiver that facilitates maintaining an associated device in a low-power mode.

Systems, methods and other embodiments associated with a smart transceiver that improves conservation of power in an associated device are disclosed. As previously noted, various configurations of vehicle networks generally involve maintaining all devices connected with the network in a powered-on state in order for the network to function as designed. However, this approach fails to recognize that idle devices can consume significant quantities of energy leading to less efficient use of available resources (e.g., stored energy in a battery). Thus, in relation to vehicles such as electric vehicles, use of this form of network configuration can, for example, cause a reduction in efficient use of power overall leading to effects such as a reduction in range.

Therefore, in one embodiment, a smart transceiver and methods of operating the smart transceiver are disclosed that improve the efficiency of devices connected to a network. In one embodiment, the smart transceiver performs various network functions on behalf of the device so that the device can remain in a low-power mode (e.g., electrically powered off or substantially off) for extended periods without waking. For example, in one approach, the disclosed smart transceiver is powered separately from an associated device such as a microcontroller, electronic control unit (ECU), or another similar device. Thus, when the microcontroller enters a low-power mode, the smart transceiver remains powered and functions on behalf of the microcontroller to manage communications with the network.

It should be appreciated that as used herein "low-power mode" generally refers to a state of the device, such as a microcontroller, in which an overall amount of energy that is consumed by the device is reduced from an on/powered state. In various embodiments, the particular extent to which the device reduces consumption of energy during the low-power state may vary. For example, in one approach, the device is completely without power when in the low-power mode. In further examples, the device maintains power in components such as a program counter, wakeup module, volatile memory (e.g., in a standby mode) and so on while removing power from other components (e.g., processing unit) when in the low-power mode. Whichever approach is undertaken, as a general tenet, the low-power mode conserves energy relative to an on/powered mode of the device.

Accordingly, when in the low-power mode, the device is, in one or more embodiments, generally incapable of performing functions undertaken during a powered-on state such as processing communications from the network and generating communications for transmission onto the network. This change in processing abilities is generally because of the unavailability of processing components (e.g., the processing unit, memory, etc.) in the device. Therefore, the smart transceiver performs network functions (e.g., monitoring, buffering, communicating) on behalf of the device and determines when, for example, to wake the device from the low-power mode.

In one embodiment, the smart transceiver communicates with a network such as a controller area network (CAN) bus that carries communications for a plurality of ECUs in a vehicle. Thus, the communications can include communications directed to the device associated with the smart transceiver; however, depending on a particular functionality of the device such messages may be infrequent. Moreover, the network further conveys communications for general network management such as node alive messages (e.g., heartbeat communications) that inform devices on the network of the continued presence of other devices and, for example, a general health of the network overall. Additionally, the network can also communicate various management frames. Accordingly, the network can communicate a wide array of information which may or may not be relevant to the particular device.

Therefore, in one or more embodiments, the smart transceiver manages communications with the network on behalf of the device. In one aspect, the smart transceiver periodically transmits node alive messages and event messages (that indicate a current state, status, or configuration of the device, e.g., network status, switch status, seat position, configuration settings, action options, and so on) on behalf of the device in order to maintain a presence of the microcontroller on the network and ensure that the microcontroller continues to meet protocols of the network even though operating in the low-power mode. Additionally, in one embodiment, the smart transceiver transmits node alive message to maintain a presence of the device 160, messages to indicate a current state, status or configuration of the device 160 (e.g. switch status, seat position, configuration setting, action options, and so on), etc. while the device 160 is in the low-power mode. Moreover, the device 160 can provide information for configuring the messages provided by the transceiver 100 prior to entering the low-power mode. In further aspects, the smart transceiver actively monitors communications on the network to determine when to wake the device from the low-power mode.

For example, the smart transceiver, in one approach, buffers communications from the network while the device is in the low-power mode. The smart transceiver analyzes the communications to determine, for example, whether the device should be activated into a powered-on state from the low-power mode. In various approaches, the smart transceiver may be configured to wake the microcontroller according to different wake conditions as determined from the analyzed communications. For example, the wake conditions may include identifying that a communication is directed to the microcontroller, identifying that a communication specifies a change in state of the network, and so on. In either case, the smart transceiver can provide the buffered communications to the device upon the device exiting the low-power mode. In this way, the smart transceiver provides for managing communications with the network on behalf of the device thereby improving efficient operation of the device.

Referring to FIG. 1, one embodiment of an transceiver 100 is illustrated. While arrangements will be described herein with respect to the transceiver 100 and an associated device 160, it will be understood that embodiments are not limited to a configuration as illustrated. In some implementations, the transceiver 100 may be embodied as a standalone component, within another component (e.g., SBC) separate from the device 160, embedded with the device 160, and so on. Accordingly, the transceiver 100 is illustrated and discussed as a single component for purposes of discussion but should not be interpreted to limit the overall possible configurations in which the disclosed components may be configured. For example, the separate modules, memories, databases, devices, and so on may be integrated in various combinations.

The transceiver 100 also includes various elements. It will be understood that in various embodiments it may not be necessary for the transceiver 100 to have all of the elements shown in FIG. 1. The transceiver 100 can have any combination of the various elements shown in FIG. 1. Further, the transceiver 100 can have additional elements to those shown in FIG. 1. In some arrangements, the transceiver 100 may be implemented without one or more of the elements shown in FIG. 1. Further, while the various elements are shown as being located within the transceiver 100 in FIG. 1, it will be understood that one or more of these elements can be located external to the transceiver 100. Further, the elements shown may be physically separated by large distances. Moreover, the illustrated components may be integrated with the transceiver 100 itself or shared with another component.

Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In either case, the transceiver 100 is implemented to perform methods and other functions as disclosed herein relating to managing communications with a network to facilitate a device 160 remaining in a low-power mode. The noted functions and methods will become more apparent with a further discussion of the figures. Furthermore, the transceiver 100 is shown as including a processor 110. Thus, in various implementations, the processor 110 may be a part of the transceiver 100, the transceiver 100 may access the processor 110 through a data bus or another communication pathway, and so on. In either case, the processor 100 is an electronic device such as a microprocessor, a controller, an ASIC, or another computing component that is capable of executing machine-readable instructions to produce various electronic outputs therefrom that may be used to control or cause the control of other electronic devices.

In one embodiment, the transceiver 100 includes a memory 120 that stores a power module 130, and a communication module 140. The memory 120 is a random-access memory (RAM), read-only memory (ROM), a hard-disk drive, a flash memory, or other suitable memory for storing the modules 130, and 140 and/or data operated on by the modules 130/140. The modules 130, and 140 are, for example, computer-readable instructions that when executed by the processor 110 cause the processor 110 to perform the various functions disclosed herein. In various embodiments, the modules 130, and 140 can be implemented in different forms that can include but are not limited to hardware logic, an ASIC, components of the processor 110, instructions embedded within an electronic memory, and so on.

With continued reference to the transceiver 100, in one embodiment, the system 100 includes a buffer 150. The buffer 150 is, in one embodiment, an electronic data structure that is part of the memory 120, stored in the memory 120, or is a separate electronic data store (e.g., register, memory, buffer). Thus, in one embodiment, the buffer 150 stores data including communications from the network 170 used by the modules 130 and 140 in executing various determinations. In one or more arrangements, the buffer 150 itself is a first-in first-out (FIFO) buffer, a cache memory, a volatile memory, or another working memory that provides for low-latency storage and retrieval of the communications. In further embodiments, the transceiver 100 stores the communications in the memory 120, a specialized data structure, a cache memory of the processor 110, or another suitable data storage component.

As used herein, the device 160 refers to, in one or more embodiments, a microcontroller for controlling one or more aspects of a vehicle. In further embodiments, the device 160 is an ECU, or other electronic controller that, for example, receives electronic inputs from direct-wired inputs, the network 170, a wireless interface, or other suitable means and produces control signals in response to the inputs that are provided back over the network 170 or through another mechanism and that may actuate switches, motors, displays, and so on to perform various functions. In one or more embodiments, the device 160 is a microcontroller for an airbag, an engine, a radio, a transmission, a seat motor(s), a seat memory module, an infotainment display, windshield wipers, parking brake, or other such components in a vehicle. It should be appreciated that while a vehicle is used as an example environment for the network 170, the transceiver 100, and the device 160, in further aspects, the noted components may be implemented in other systems (e.g., watercraft, airplanes, etc.) that use a similar network configuration.

The network 170 is, in one embodiment, a controller area network (CAN) bus that carries communications for a plurality of devices (e.g., microcontrollers) in a vehicle. In further aspects, the particular configuration of the network 170 may vary. For example, in one or more approaches, the network 170 is a local interconnect network (LIN), avionics/automotive dual-duplex switched Ethernet (AFDX), BroadR-Reach, FlexRay, CAN flexible data-rate (CAN FD), Time-Triggered Protocol (TTP), vehicle area network (VAN), or another suitable standard and medium (e.g., single-twisted pair, etc.) for such applications.

Figure 2:
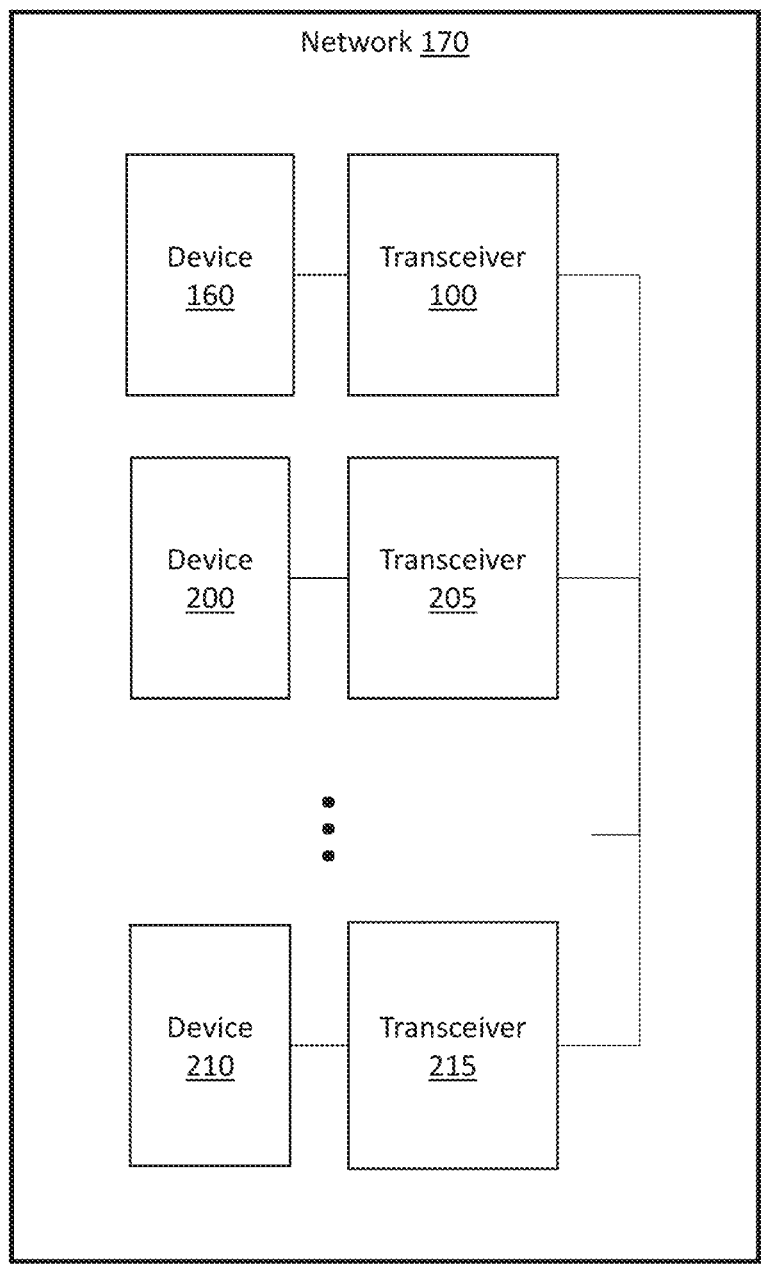
FIG. 2 illustrates one example of a network in which the transceiver of FIG. 1 may operate.

In either case, the network 170 and the devices operating thereon generally conform to an established protocol for communicating and providing information about the status of various components. Thus, the network 170 carries communications between the noted components. For example, FIG. 2 illustrates one example of the network 170. As illustrated in FIG. 2, the network 170 carries communications between multiple devices or, more particularly, between transceivers associated with each of the devices. For example, the device 160, device 200, and device 210 can communicate with one another over the network 170 and through associated transceivers 100, 205, and 215. In further aspects, the network 170 may include fewer or more devices depending on a particular implementation. Additionally, the various devices may be configured with a transceiver similar to the transceiver 100 (i.e., embedded with functionality to facilitate a low-power mode) or with another transceiver that does not include the noted functionality. In either case, the devices transmit and receive communications via an associated transceiver connected to the network 170. It should be appreciated that the devices attached to the network 170 via the respective transceivers can be, for example, various modules, microcontrollers, ECUs, and so on that perform different functions in the vehicle.

Thus, the communications carried over the network 170 can include communications directed to the device 160 associated with the smart transceiver 100, general network management communications, communications between other devices, and so on. However, depending on a particular functionality of the device 160, communications having particular relevance to the device 160 and/or communications directed to the device 160 may be infrequent. Thus, the device 160 may be inactive for extended periods of time even though in a powered-on state and consuming energy. Thus, in one embodiment, the device 160 initiates a low-power mode to conserve energy when, for example, inactive.

In various approaches, the conditions for initiating the low-power mode can vary. However, it should be appreciated that, in one embodiment, the device 160 initiates the low-power mode due to inactivity or predicted inactivity. That is, either the device 160, the transceiver 100, another component (e.g., system basis chip (SBC)), or a combination of two or more of the noted components, is configured to determine when and to initiate the device 160 to enter the low-power mode. As indicated, the conditions for entering the low-power mode can include inactivity for a defined amount of time, predicted inactivity (e.g., based on knowledge of some event in the vehicle such as traveling at a certain rate of speed indicating a trip has begun), a communication received from another device indicating the device 160 should enter a low-power mode, a defined change in signal values on the network 170, and so on.

Figure 3:
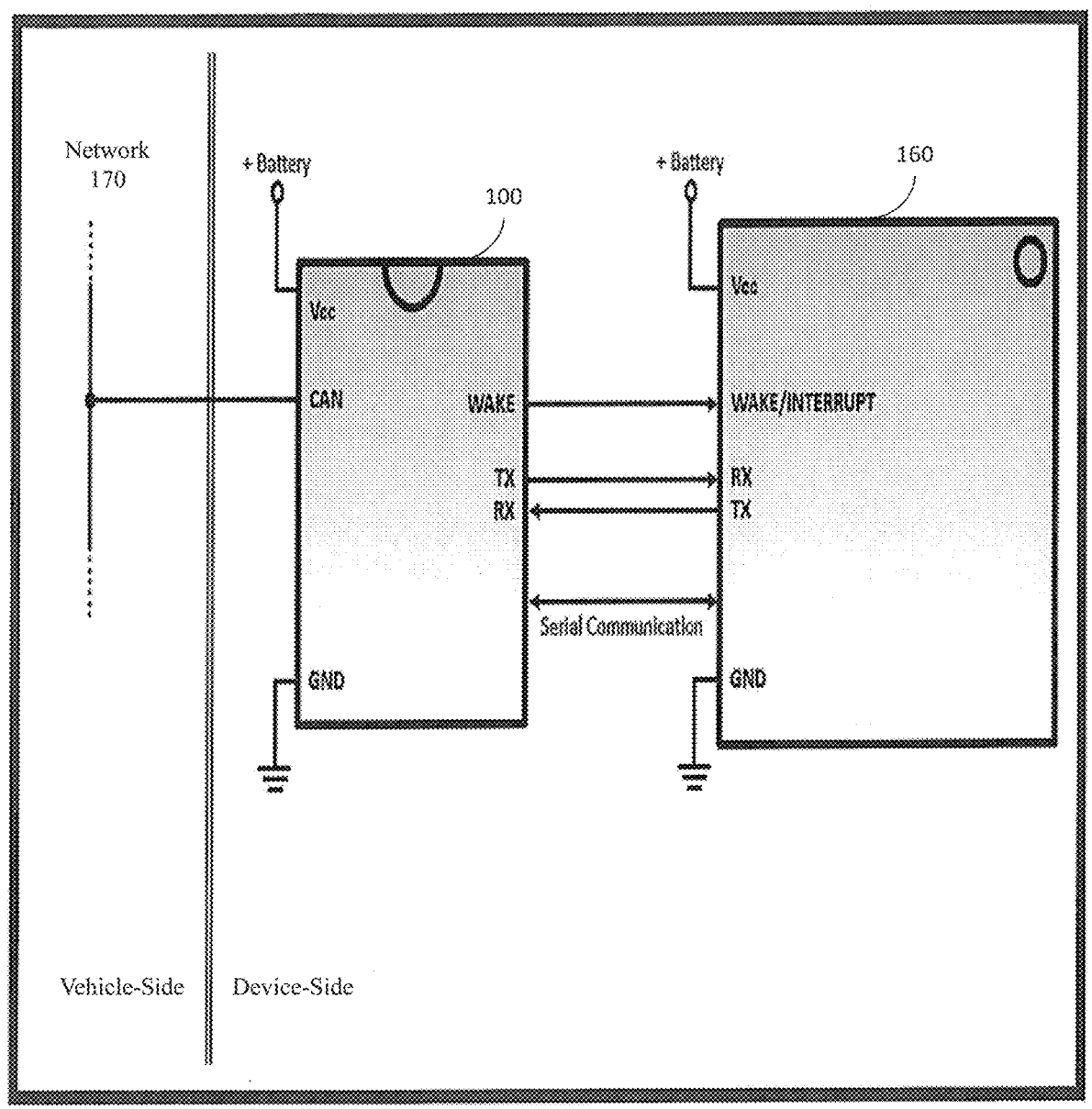
FIG. 3 illustrates one embodiment of a configuration of a transceiver as disclosed herein and an associated microcontroller.

In either case, the device 160 or a combination of the noted components (e.g., transceiver 100, device 160, SBC, etc.) initiates and enters the low-power mode upon the occurrence of one or more of the noted conditions. In one embodiment, as part of entering the low-power mode, the device 160 provides an electric signal to the transceiver 100 over a wired connection in order to indicate to the transceiver 100 about the initiation of the low-power mode. In alternative embodiments, the device 160 sets a register or a data value in another storage element to indicate whether the low-power mode is active or not, and, thus, the transceiver 100 can monitor the register to maintain an awareness of the current power state for the device 160. As one example, consider FIG. 3, which illustrates an additional embodiment of the transceiver 100 and the device 160. As illustrated, the transceiver 100 and the device 160 share several different connections for providing information therebetween. For example, FIG. 3 illustrates, from the perspective of the device 160, a wake/interrupt connection, a receive RX connection, a transmit TX connection, and a serial communication connection, which provide for conveying information between the transceiver 100 and the device 160. In one approach, the transceiver 100 and/or an SBC controls power provided to the device 160. Thus, the transceiver, in one approach, controls when the device 160 receives power and, for example, also how much power. Accordingly, initiating the low-power mode in the device 160 includes powering down the device 160.

It should be appreciated that the illustrated set of connections are provided without limitation and for exemplary purposes. In either case, the transceiver 100 can use the wake/interrupt connection with the device 100 to monitor the device 160 and determine when the device 160 initiates a low-power mode. In further embodiments, the transceiver 100 receives a communication about the device 160 entering the low-power mode over the serial communication connection or the Tx/Rx connections. The indication about the device 160 entering the low-power mode, in one embodiment, is a simple identifier indicating the switch between states. In further examples, the device 160 conveys configuration information about a wake condition or set of conditions to the transceiver 100 over the serial communication connection.

Continuing with FIG. 1, once the device 160 enters the low-power mode, the power module 130 begins to monitor the network 170 on behalf of the device 160. Accordingly, the power module 130, in one embodiment, includes computer-readable instructions that when executed by the processor 110, cause the processor to monitor communications from the network 170 in order to, for example, determine when to wake the device 160. In one approach, the power module 130 analyzes communications/signals as the communications are received from the network 170. In analyzing the communications, the power module 130 is assessing the communications to determine whether to wake the device 160 from the low-power mode.

Thus, in general, the power module 130 stores the communications in the buffer 150 as the communications are received. In further aspects, the power module 130 selectively stores the communications depending on particular relevance to the device 160. That is, if the power module 130 determines that a communication satisfies a wake condition, then, in one embodiment, the power module 130 (or the communication module 140 in an alternative approach) stores the communication in the buffer 150 until the device 160 is powered on and ready to process the communication. Thus, in one approach, the power module 130 may discard other communications that do not satisfy the wake condition.

The wake condition, in one approach, defines a set of conditions, which either individually or in combination define circumstances for which the power module 130 is to wake the device 160 from the low-power mode. For example, the set of conditions can include particular types of messages (i.e., a category (level of importance) or transmitted from a particular device), a particular signal, a particular signal value, a defined change in a signal value, an error condition (e.g., loss of communication condition), and so on. For example, the wake condition may specify criteria such as to wake the device 160 upon receiving a communication indicating an ID of the device 160 as the intended receiver. Thus, when the power module 130 receives a communication that is directed to the device 160, the power module 130 can wake the device 160. As another example, when the power module 130 receives a communication that is not explicitly directed to the device 130 but that specifies information (e.g., network-off message) effecting the device 160, the power module 130 may wake the device 160.

In further examples, the power module 130 stores the communications in the buffer 150 to log events occurring on the network 170 so that when the device 160 does wake from the low-power mode, the communications can be provided to the device 160. In one arrangement, the communication module 140 buffers the communications received from the network 170 (either selectively or comprehensively depending on the implementation) while the power module 130 performs analysis of the communications and acts to wake the device 160 when necessary. Moreover, in one embodiment, the communication module 140 forwards communications from the network 170 to the buffer 150 while the device 160 is in the low-power mode, and the buffer 150 is configured with logic to filter the communications and store communications meeting criteria previously defined. In one embodiment, the criteria for filtering messages from the buffer 150 are configured by the device 160 as part of initiating the low-power mode. In either case, the communication module 140 can then provide the communications in the buffer 150 to the device 160 or at least inform the device 160 of the presence of the communications so that the device 160 can directly retrieve the communications from the buffer 150.

In one embodiment, the communication module 140 includes instructions that when executed by the processor 110 cause the processor 110 to perform one or more network functions on behalf of the device 160. As used herein, a network function is generally a task executed by the device 160 in relation to the communications when not in the low power mode. Thus, as provided for herein, the communication module 140 performs one or more of the network functions for the device 160 so that the device 160 can remain in the low-power mode and can simultaneously retain an active status on the network 170 from the perspective of other devices while actually being in the low-power mode.

Accordingly, in one embodiment, the communication module 140 transmits a node alive communication (e.g., heartbeat signal) at defined regular intervals on behalf of the device 160 when the device 160 is in the lower power mode. Because the network 170, as a matter of an implemented protocol, may require periodic node alive communications from the device 160 and other devices attached to the network 170 in order to, for example, track a status of the network 170 and devices communicating on the network 170. Additionally, in one embodiment, the smart transceiver transmits periodic messages (e.g, node alive messages) to to indicate a current state, status or configuration of the device 160 (e.g. switch status, seat position, configuration setting, action options, and so on), etc. while the device 160 is in the low-power mode. Moreover, the device 160 can provide information for configuring the messages provided by the transceiver 100 prior to entering the low-power mode. In further aspects, the communication module 140 performs network functions such as relaying the communications from the buffer to the device 160 upon the device 160 switching from the low-power mode into a powered-on state/mode. In still further aspects, the communication module 140 generates, for example, acknowledgment messages in response to receiving a communication directed to the device 160.

That is, for example, the communication module 140, either individually or in combination with the power module 130, identifies a communication directed to the device 160 from a device ID in the communication matching the device 160. Thus, while the power module 130 proceeds with waking the device 160, which may take several clock cycles, the communication module 140 generates and transmits an "ACK" message on behalf of the device 160 in order to maintain a status of the device 160 on the network 170 as active. Thus, upon the device 160 entering a powered-on state, the communication module 140 can relay the communication to the device 160, and the device can begin communicating as though it was in a powered-on state when it was actually in a low-power mode. In this way, the transceiver 100 improves operation of the device 160 on the network 170 by optimizing an ability of the device 160 to remain in a low-power mode.

Figure 4:
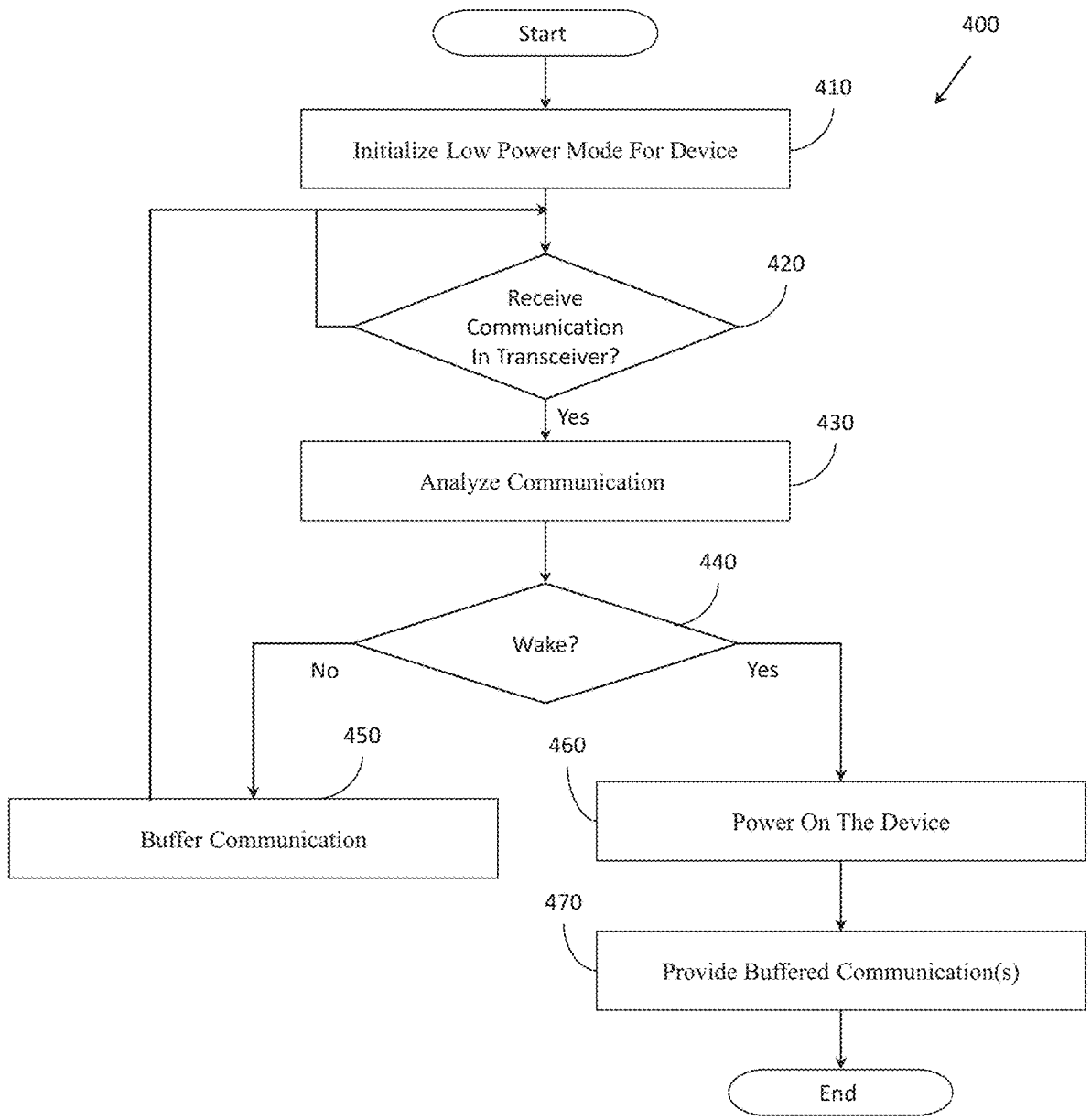
FIG. 4 illustrates one embodiment of a method associated with controlling a transceiver to perform network functions on behalf of a device while the device is in a low-power mode.

Additional aspects of a transceiver that manages communications with a network in order to optimize a low-power mode for a device will be discussed in relation to FIG. 4. FIG. 4 illustrates a method 400 associated with performing various network functions on behalf of a device when the device is in a low-power mode. Method 400 will be discussed from the perspective of the transceiver 100 of FIG. 1. While method 400 is discussed in combination with the transceiver 100, it should be appreciated that the method 400 is not limited to being implemented within the transceiver 100 but is instead one example of a system that may implement the method 400.

At 410, the device 160 initializes the low-power mode. In one embodiment, initializing the low-power mode includes receiving in the transceiver 100 one or more signals. The signals specify, for example, various aspects about the low-power mode such as i. the device 160 is entering the low-power mode, ii. wake conditions for exiting the low-power mode, and iii. network management activities/information that the transceiver 100 is to execute during the low-power mode. While three separate aspects are disclosed in relation to the information, in various embodiments, the provided information/instructions may vary to include fewer or more aspects. In either case, transceiver 100/power module 130 can receive various configuration information from the device 160 at the initiation of the low-power mode. In further aspects, the configuration information may be pre-programmed or provided periodically from a host controller that is separate from the device 160.

As previously noted, the low-power mode involves the device 160 powering off at least a portion of components in the device 160 to conserve power when the device 160 has been, for example, inactive for a predefined period of time or according to another specified condition. Thus, in one embodiment, as part of initializing the low-power mode, the power module 130 receives the wake conditions from the device 160. The wake conditions may be provided according to, for example, the particular condition that is causing the device 160 to enter the low-power mode, and, thus, the wake conditions may vary for a particular occurrence of the low-power mode. Alternatively, the wake conditions may be independent of the conditions inducing the low-power mode. Moreover, in one aspect, because the transceiver 100 may be integrated with a system basis controller (SBC) that manages power consumption by the device 160, the power module 130 may monitor aspects of the SBC such as present voltages supplied to the device 160, and so on in order to determine when the device 160 enters the low-power mode.

At 420, the power module 130 monitors for communications on the network 170. Thus, in one embodiment, as part of entering the low-power mode the transceiver 100 functions on behalf of the device 160 to perform various network functions for the device 160. In one or more aspects, the noted network functions include monitoring the communications for communications that are relevant to the device 160 (i.e., communications to which the device 160 is to respond, is to perform one or more actions as a result of, etc.). Moreover, in further aspects, beyond monitoring the communications, the communication module 140 performs various network management functions such as transmitting node alive communications (e.g., network communication active (NCA) communications).

At 430, the power module 130 analyzes the communications. In one embodiment, the power module 130 parses information included as the communications to identify types of the messages, IDs in the messages, and other distinguishing aspects. As a general matter, the power module 130 is analyzing the communications to derive information that facilitates determining whether the communications satisfy the wake conditions and thus whether the power module 130 is to wake the device 160 so that the device 160 can, for example, respond to the communication or perform another action. In one embodiment, the communication module 140 also analyzes the communications or at least uses determinations provided by the power module 130 in regard to the communications to determine whether to buffer the communications as further noted at 450.

At 440, the power module 130 determines whether the communication(s) satisfy the wake condition(s). In one embodiment, the power module 130 compares the information about the communications as noted in reference to block 430 with the wake conditions to determine whether the communications satisfy the wake condition. In one embodiment, the wake conditions can specify various logic terms such as equal to, greater than, less than, and so on in relation to some defined value associated with the communication. Additionally, the wake condition may specify more complex criteria such as changes over periods of time, combinations of conditions, and so on. In either case, the power module 130 determines whether the communications satisfy the wake condition and proceed to block 450 and further monitoring at block 410 if the wake conditions are not satisfied versus waking the device 160 as discussed in relation to blocks 460 and 470.

At 450, the communication module 140 buffers the communications when the device 160 is in the low-power mode to prevent the device 160 from not receiving the communications. In one embodiment, the communication module 140 selectively buffers the communications according to whether the communications are relevant to the device 160 or not. In further aspects, the communication module 140 stores communications about both events and messages in the buffer 150. That is, the communication module 130 may log communications that are not sufficient to satisfy the wake condition but may be useful for maintaining a state or awareness of the device 160 once powered on. Thus, such event communications can be maintained in the buffer 150 without waking the device 160. Furthermore, in additional aspects, the communication module 140 also stores communications that do satisfy the wake condition in order to retain the communications during a wakeup time of the device 160. Accordingly, while the method 400 does not explicitly illustrate block 450 as occurring prior to or coincident with the block 460, in one embodiment, the communication module 140 stores the communications in the buffer 150 when the wake condition is met in order to ensure the communications are passed to the device 160 subsequently.

At 460, in response to the power module 130 determining the wake condition has been satisfied, the power module 130 generates and provides a wake signal to the device 160 to switch the device 160 from the low power mode into an on mode. In one embodiment, the power module 130 generates a signal that is provided over a dedicated wake connection line to the device 160. In an alternative approach, the power module 130 generates a signal that is provided to a voltage/power management component in the SBC that then reinstates power to the offline components of the device 160. In either case, the power module 130 causes the device 160 to wake from the low-power mode and proceed to function in a powered-on state thereby, for example, responding to the communications or performing other actions in response to the communications.

At 470, the communication module 140 provides the communications stored in the buffer 150 to the device 160. In one embodiment, the communication module 140 relays contents of the buffer 150 to the device 160 over a serial connection or other suitable communication pathway. In various approaches, the communication module 140 may provide the stored communications according to a time when the communications were received, according to relevancy, or according to another suitable approach. In either case, the transceiver 100, in one embodiment, implements the method 400 in order to improve operating efficiency of the device 160 by facilitating the use of the low-power mode by the device 160 independently of a status of the network 170.

Additionally, it should be appreciated that the transceiver 100 from FIG. 1 can be configured in various arrangements with separate integrated circuits and/or chips. In such embodiments, the power module 130 from FIG. 1 is embodied as a separate integrated circuit. Additionally, the communication module 140 is embodied on an individual integrated circuit. The circuits are connected via connection paths to provide for communicating signals between the separate circuits. Of course, while separate integrated circuits are discussed, in various embodiments, the circuits may be integrated into a common integrated circuit board. Additionally, the integrated circuits may be combined into fewer integrated circuits or divided into more integrated circuits. In another embodiment, the modules 130 and 140 may be combined into a separate application-specific integrated circuit. In further embodiments, portions of the functionality associated with the modules 130 and 140 may be embodied as firmware executable by a processor and stored in a non-transitory memory. In still further embodiments, the modules 130 and 140 are integrated as hardware components of the processor 110.

In another embodiment, the described methods and/or their equivalents may be implemented with computer-executable instructions. Thus, in one embodiment, a non-transitory computer-readable medium is configured with stored computer executable instructions that when executed by a machine (e.g., processor, computer, and so on) cause the machine (and/or associated components) to perform the method.

While for purposes of simplicity of explanation, the illustrated methodologies in the figures are shown and described as a series of blocks, it is to be appreciated that the methodologies (e.g., method 400 of FIG. 4) are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional blocks that are not illustrated.

The transceiver 100 can include one or more processors 110. In one or more arrangements, the processor(s) 110 can be a main processor of the transceiver 100. For instance, the processor(s) 110 can be an electronic control unit (ECU). The transceiver 100 can include one or more data stores for storing one or more types of data. The data stores can include volatile and/or non-volatile memory. Examples of suitable data stores include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, distributed memories, cloud-based memories, other storage medium that are suitable for storing the disclosed data, or any combination thereof. The data stores can be a component of the processor(s) 110, or the data store can be operatively connected to the processor(s) 110 for use thereby. The term "operatively connected," as used throughout this description, can include direct or indirect connections, including connections without direct physical contact.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Examples of such a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read. In the context of this document, a computer-readable storage medium may be any tangible medium that can contain, or store a program for use by or in connection with an instruction execution system, apparatus, or device.

The following includes definitions of selected terms employed herein. The definitions include various examples and/or forms of components that fall within the scope of a term and that may be used for various implementations. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Module," as used herein, includes a computer or electrical hardware component(s), firmware, a non-transitory computer-readable medium that stores instructions, and/or combinations of these components configured to perform a function(s) or an action(s), and/or to cause a function or action from another logic, method, and/or system. Module may include a microprocessor controlled by an algorithm, a discrete logic (e.g., ASIC), an analog circuit, a digital circuit, a programmed logic device, a memory device including instructions that when executed perform an algorithm, and so on. A module, in one or more embodiments, includes one or more CMOS gates, combinations of gates, or other circuit components. Where multiple modules are described, one or more embodiments include incorporating the multiple modules into one physical module component. Similarly, where a single module is described, one or more embodiments distribute the single module between multiple physical components.

Additionally, module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A transceiver for providing communications between a network and a device, comprising:
    one or more processors;
    a buffer for storing the communications;
    a memory communicably coupled to the one or more processors and storing:
    a power module including instructions that when executed by the one or more processors cause the one or more processors to, in response to the device associated with the transceiver entering a low power mode while the transceiver remains in a powered mode, analyze communications received in the transceiver to determine whether at least one of the communications satisfies a wake condition for waking the device out of the low-power mode wherein the transceiver communicates via a communication network of a vehicle; and
    a communication module including instructions that when executed by the one or more processors cause the one or more processors to perform a network function on behalf of the device when the device is in the low-power mode, wherein the communication network is a control area network (CAN) bus of the vehicle, and wherein the transceiver is integrated onto a system basis chip (SBC) with the device.

2. The transceiver of claim 1, wherein the communication module includes instructions to perform the network function including instructions to store in the buffer the communications when the device is in the low-power mode to prevent the device from not receiving the communications via a wired connection to a communication network of the vehicle, and
    wherein the device enters the low power mode by powering off at least a portion of components in the device to conserve power when the device has been inactive for a predefined period of time.

3. The transceiver of claim 1, wherein the communication module includes instructions to perform the network function including instructions to, in response to determining that one of the communications satisfies the wake condition, i) provide a wake signal to the device to switch the device from the low power mode into an on mode and ii) relay contents of the buffer to the device.

4. The transceiver of claim 1, wherein the power module includes instructions to monitor the communications including instructions to analyze the communications in the transceiver as the communications are received to determine whether one or more of the communications satisfies a wake condition for waking the device out of the low-power mode,
    wherein the network function is a task executed by the device in relation to the communications when not in the low power mode.

5. The transceiver of claim 4, wherein the wake condition specifies one or more criteria for switching the device from the low power mode to an on mode including receiving one of the communications identifying the device as a target, and a bus wakeup command.

6. The transceiver of claim 1, wherein the communication module includes instructions to perform the network function including instructions to transmit, by the transceiver, a node alive communication on a wired connection at defined regular intervals on behalf of the device when the device is in the low-power mode.

7. The transceiver of claim 1, wherein the power module includes instructions to, in response to the device entering the low power mode, configure the wake condition for exiting the low power mode according to attributes defined by a message requesting the low power mode from the device, and wherein the transceiver is integrated with a system basis chip (SBC) of the device.

8. A non-transitory computer-readable medium storing instructions for conserving energy in a device attached to a transceiver and that when executed by one or more processors cause the one or more processors to:
    in response to the device associated with the transceiver entering a low power mode while the transceiver remains in a powered mode, analyzing communications received in the transceiver to determine whether at least one of the communications satisfies a wake condition for waking the device out of the low-power mode, wherein the transceiver communicates via a communication network of a vehicle; and
    perform a network function on behalf of the device when the device is in the low power mode, wherein the communication network is a control area network (CAN) bus of the vehicle, and wherein the transceiver is integrated onto a system basis chip (SBC) with the device.

9. The non-transitory computer-readable medium of claim 8, wherein instructions to perform the network function include instructions to store in a buffer the communications when the device is in the low-power mode to prevent the device from not receiving the communications via a wired connection to a communication network of the vehicle, and
wherein the device enters the low power mode by powering off at least a portion of components in the device to conserve power when the device has been inactive for a predefined period of time.

10. The non-transitory computer-readable medium of claim 8, wherein the instructions to perform the network function include instructions to, in response to determining that one of the communications satisfies the wake condition, i) provide a wake signal to the device to switch the device from the low power mode into an on mode and ii) relay contents of the buffer to the device.

11. The non-transitory computer-readable medium of claim 8, wherein the instructions to monitor the communications include instructions to analyze the communications in the transceiver as the communications are received to determine whether one or more of the communications satisfies the wake condition for waking the device out of the low-power mode,
wherein the network function is a task executed by the device in relation to the communications when not in the low power mode.

12. The non-transitory computer-readable medium of claim 8, wherein the wake condition specifies one or more criteria for switching the device from the low power mode to an on mode including receiving one of the communications identifying the device as a target, and a bus wakeup command.

13. A method of conserving energy in a device attached to a transceiver, comprising:
in response to the device entering a low power mode while the transceiver remains in a powered mode, monitoring communications received in the transceiver on behalf of the device to determine when to wake the device out of the low-power mode according to a wake condition wherein the transceiver communicates via a communication network of a vehicle; and
performing, by the transceiver, at least one network function on behalf of the device when the device is in the low-power mode, wherein the communication network is a control area network (CAN) bus of the vehicle, and wherein the transceiver is integrated onto a system basis chip (SBC) with the device.

14. The method of claim 13, wherein performing the network function includes buffering the communications when the device is in the low-power mode to prevent the device from not receiving the communications via a wired connection to a communication network of the vehicle, and
wherein entering the low power mode includes powering off at least a portion of components in the device to conserve power when the device has been inactive for a predefined period of time.

15. The method of claim 13, wherein performing the network function includes, in response to determining that one of the communications satisfies the wake condition, i) providing a wake signal to the device to switch the device from the low power mode into an on mode and ii) relaying contents of a buffer to the device.

16. The method of claim 13, wherein monitoring the communications includes analyzing the communications in the transceiver as the communications are received to determine whether one or more of the communications satisfies the wake condition for waking the device out of the low-power mode,
wherein the network function is a task executed by the device in relation to the communications when not in the low power mode.

17. The method of claim 16, wherein the wake condition specifies one or more criteria for switching the device from the low power mode to an on mode including receiving one of the communications identifying the device as a target, and a bus wakeup command.

18. The method of claim 13, wherein performing the network function includes transmitting, by the transceiver, a node alive communication on a wired connection at defined regular intervals on behalf of the device when the device is in the low power mode.

19. The method of claim 13, wherein entering the low power mode includes configuring the wake condition for exiting the low power mode according to attributes defined by a message requesting the low power mode from the device.

* * * * *